Oct. 26, 1943.                G. N. SLEZSKINSKY                2,332,610
           APPARATUS FOR CONNECTING BALANCED AND UNBALANCED
                   NETWORKS IN ELECTRICAL SYSTEMS
                        Filed Nov. 13, 1941
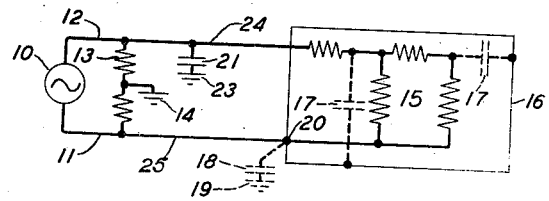
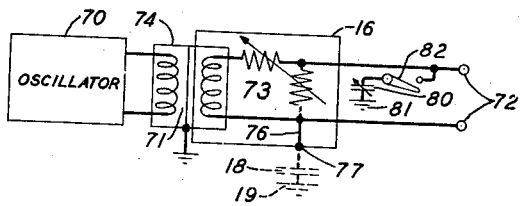
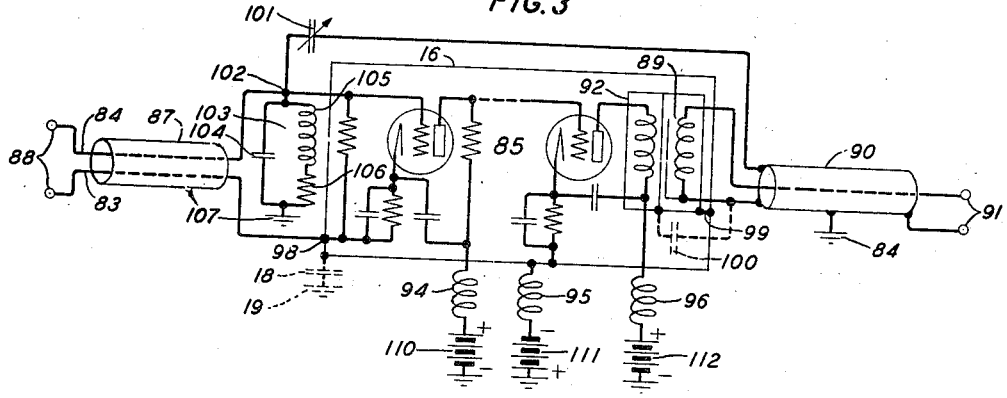
INVENTOR
G. N. SLEZSKINSKY
BY
P. J. Roche
ATTORNEY Patented Oct. 26, 1943

2,332,610

UNITED STATES PATENT OFFICE 2,332,610

APPARATUS FOR CONNECTING BALANCED AND UNBALANCED NETWORKS IN ELECTRICAL SYSTEMS

Gregory N. Slezskinsky, Dunellen, N. J., assignor to Western Electric Company, Incorporated, New York, N. Y., a corporation of New York Application November 13, 1941, Serial No. 418,946

6 Claims. (Cl. 178—44)

This invention relates to a signaling system embodying apparatus balanced and unbalanced to ground potential, and more particularly to an arrangement to adapt such system to compensate for the effects of a parasitic capacitor serving to connect the unbalanced apparatus to a neighboring point at ground potential.

This is a continuation in part of application Serial No. 346,567, filed July 20, 1940, Patent No. 2,267,430, issued December 23, 1941.

In signaling systems in which apparatus balanced to ground potential is connected in sequence with apparatus unbalanced to ground potential and enveloped in an electromagnetic shield, it has been found that the occurrence of a parasitic capacity may serve to connect effectively the shield and a portion of the signaling circuit to a neighboring point at ground potential. In the absence of such parasitic capacitor, equal currents will be caused to flow to ground in the balanced apparatus. However, due to the occurrence of such parasitic capacitor, unequal currents will be caused to flow to ground in the balanced apparatus. Consequently, the normally balanced to ground condition of the latter apparatus is upset. This tends, therefore, to impair signaling transmission in the system.

Accordingly, the present invention contemplates an arrangement to neutralize the effects of parasitic capacitors in signaling systems.

The main object of the invention is to provide a device for expeditiously connecting in a signaling system apparatus balanced and unbalanced to ground potential.

It is another object to compensate for ground admittance due to parasitic capacitance and inductance effects occurring in a signaling system.

In a specific embodiment, the invention comprises a point at ground potential, a capacitor, and circuit means to connect one capacitor terminal to the ground point and another capacitor terminal to the side of the signaling circuit opposite to the side thereof effectively connected by a parasitic capacitor to a further point at ground potential.

A feature of the invention enables the connection in signaling systems of apparatus balanced and unbalanced to ground potential. An additional feature involves the connection in a signaling system of apparatus which is neither balanced nor unbalanced to ground potential. Another feature relates to an expeditious embodiment in an oscillator circuit such that the output of the latter may be effectively supplied to a load balanced or unbalanced to ground potential. A further feature relates to the connection of a thermionic amplifier, which is inherently unbalanced with respect to ground potential, to a balanced conductor pair without the usual intermediary input transformer.

The invention will be readily understood from the following description taken together with the accompanying drawing, in which:

Fig. 1 is a schematic circuit showing a general application of a specific embodiment of the invention;

Fig. 2 is a schematic circuit illustrating the invention embodied in an oscillation system; and Fig. 3 is a schematic circuit representing the invention utilized for connecting in sequence a balanced conductor pair, a thermionic amplifier, and a concentric conductor line.

In the following description the same reference numerals are employed to identify the same elements appearing in the several figures of the drawing.

Referring to Fig. 1, a source 10 of alternating current waves is applied on leads 11 and 12 to a network 13 which, for the purpose of this description, may comprise a pair of resistance elements in series and whose mid-point is applied to a point 14 at ground potential. Leads 24 and 25 connect the network 13 to a network 15 which, for the purpose of this illustration, may comprise a pair of resistances disposed in series in the lead 24 and a pair of resistances disposed in bridge of the leads 24 and 25. An electrostatic shield 16 encloses the network 15 and is effectively connected thereto by at least two parasitic capacitors 17, 17. A terminal 20, which is common to the lead 25, one side of the network 15 and the shield 16, is connected by a parasitic capacitor 18 to a point 19 at ground potential. It is to be understood that the parasitic capacitors 17 and 18 represent the capacitance of the shield 16 to the neighboring point 19 at ground potential as hereinbefore mentioned.

From the foregoing it is obvious that the respective networks 13 and 15 are balanced and unbalanced to ground potential. Assuming for the moment that the network 13 is connected alone to the source 10, then equal amounts of current are caused to flow through both branches of the network 13 to the ground point 14. However, as the balanced network 13 is metallically connected by leads 24 and 25 to the unbalanced network 15, then unequal amounts of current are caused to flow through the branches of the network 13 to the ground point 14. In other words, the normally balanced to ground condition of the network 13 is upset.

In accordance with this invention as exemplified in Fig. 1, there is provided an arrangement which compensates for or neutralizes the effect of the parasitic capacitor 18, and which, therefore, tends to maintain the normally balanced to ground condition of the network 13. This arrangement comprises a capacitor 21 whose one side is connected to the lead 24 and the opposite side to point 23 at ground potential. The capacitor 21 whose capacitance equals substantially the capacitance of the parasitic capacitor 18 tends to ensure that equal amounts of current will flow through both branches of the balanced network 13 to the ground point 14. In view of this arrangement, networks balanced and unbalanced with respect to ground potential may be metallically connected without undue ground currents, as the balanced to ground condition of the network 13 is substantially maintained.

Fig. 2 shows the invention applied to an oscillator 70 of a conventional type whose output may be supplied through an output transformer 71 to a pair of output terminals 72, 72, which may be connected to a load, not shown, either balanced or unbalanced to ground potential. The amplitudes of the oscillation waves are controlled by an unbalanced attenuator 73. The output transformer 71 is enclosed in electromagnetic and electrostatic shield 74 while the secondary winding of this transformer and the attenuator 73 are enveloped by the electromagnetic and electrostatic shield 16. One output terminal 72 is connected by a strap 76 to point 77 on the magnetic shield 16, which point is applied by the parasitic capacitor 18 to the point 19 at ground potential. It will be understood from the foregoing description that a connection of the terminals 72, 72 to a load balanced with respect to ground potential, not shown, will cause a flow of unequal amounts of current through the branches of such load in the manner mentioned above in connection with the balanced network 13 of Fig. 1.

In accordance with the invention as shown in Fig. 2, the effect of the parasitic capacitor 18 may be compensated for by connecting one terminal of a variable capacitor 80, through a single pole, single throw switch 82, to the side of the output circuit embodying the other output terminal 72 while the opposite terminal of the capacitor 80 is applied to point 81 at ground potential. The capacitor 80 has capacitance which is equal substantially to that of the parasitic capacitor 18. This will cause substantially equal currents to flow in the branches of the balanced load, not shown, applied to the terminals 72, 72 in the manner mentioned above in connection with the balanced network 13 of Fig. 1. It is to be understood that the switch 82 serves to apply the capacitor 80 to the one output terminal 72 for a load balanced to ground potential, not shown, and to disconnect the capacitor 80 therefrom for a load unbalanced to ground potential, not shown.

Fig. 3 shows the invention applied to an arrangement whereby a vacuum tube amplifier 85, which is inherently unbalanced with respect to ground potential, has its input connected, without the aid of an input transformer, to a balanced conductor pair 83 and 84 embodied in a multiconductor cable 87 and applied across input terminals 88, 88. Both the latter may be connected to a suitable source of alternating current waves, not shown. The output of the amplifier 85 is connected through an output transformer 89 to a concentric conductor 90 which supplies the amplifier output to output terminals 91, 91 and whose outer conductor is applied to a point 84 at ground potential. A magnetic shield 92 envelopes the output transformer 89 while a magnetic shield 16 encloses both the magnetic shield 89 and the amplifier 85. Choke coils 94, 95, and 96 preclude grounding of the shield 16 through respective sources 110, 111, and 112 of direct potential utilized to energize the amplifier 85. In this connection it is to be observed that the (—) terminal of the source 111 is applied through the choke coil 95 to the shields 16 and 92 in a manner that will be hereinafter pointed out.

Parasitic capacitor 18, which represents the capacitance of the shield 16 to a neighboring point 19 at ground potential, serves to connect to the point 19 a terminal 98 which is common to the conductor 83, one side of the input of the amplifier 85 and the shield 16. A strap 99 connects electrostatic shields 16 and 92 while a parasitic capacitor 100 represents the capacitance of both shields 16 and 92 to the grounded outer conductor of the concentric conductor 90.

In accordance with the invention as illustrated in Fig. 3, a variable capacitor 101 applied across the grounded outer conductor of the concentric conductor 90 and a terminal 102, which is common to the conductor 84 of the balanced cable 87 and the other side of the input of the amplifier 85, serves to neutralize the effect of the parasitic capacitor 100. A balancing network 103 comprising a capacitor 104 in parallel with an inductor 105 and resistor 106 in series and applied intermediate the common terminal 102 and a point 107 at ground potential serves to neutralize the admittance of the shield 16 to points at ground potential effective through the choke coils 94, 95, and 96 and the parasitic capacitor 18. This amplifier, shown in its simplest form, is suitable for use in a television system as pointed out in the Bell Laboratories Record, October 1939, at page 36.

It is to be understood that while the invention is specifically described to compensate for or neutralize a particular parasitic capacitor to ground connection, it serves actually to compensate for a ground admittance which includes the particular parasitic capacitor together with the parasitic conductance effect; and further that while, for the purpose of this illustration, each figure shows but one parasitic capacitor connecting a magnetic shield to a ground point, such parasitic capacitor and ground point may comprise several in number.

Also, it is to be understood that the invention is equally applicable to measurements or connections involving conductors or other apparatus which may be neither balanced nor unbalanced to ground potential. This situation would tend to arise in those cases in which normally balanced apparatus would possess unbalance due to manufacturing imperfections so that a conventional balanced attenuator when connected to such apparatus would tend to upset an anticipated balanced or unbalanced connection. In a measuring system this would tend to provide incorrect readings.

What is claimed is:

1. In combination, a source of alternating current waves, a network balanced to ground potential, a network unbalanced to ground potential, circuit means to connect both said networks to said source, shielding means to enclose said unbalanced network, a terminal connecting said unbalanced network and said shielding means and disposed in one side of said circuit means to connect one side of said balanced network to said shielding means, at least one parasitic capacitor effectively connecting said shielding means and said one side of said balanced network through said terminal to at least one point at ground potential, and means to compensate said balanced network for the effect of the connection of said one ground point thereto through said parasitic capacitor, comprising a further capacitor, a further point at ground potential, and further circuit means to interpose said further capacitor between said further ground point and another side of said circuit means to connect said further ground point to the opposite side of said unbalanced network.

2. In combination, a source of alternating current waves, a first network balanced to ground potential and applied to said source, a second network, circuit means to connect said first network to said second network, shielding means to envelop said second network, a metallic connection extending between said second network and said shielding means and disposed in one side of said circuit means to connect one side of said first network to said shielding means so that the capacity of said shielding means to at least one point at ground potential serves to connect said latter ground point to said one side of said first network, and means to compensate for ground admittance to said first network due to the effect of the connection of said first network to said one ground point, comprising a capacitor having one terminal connected to a different side of said circuit means and thereby to the opposite side of said first network, and another terminal connected to a further point at ground potential, said capacitor having a capacity equal substantially to the capacity of said shielding means to said one ground point.

3. In combination in an electrical system, a source of alternating current waves, a first network having a condition of balanced to ground potential and applied to said source, a second network, circuit means to connect both said first and second networks, shielding means to envelop said second network, an electrical connection disposed in one side of said circuit means to connect one side of said first network to said shielding means, a parasitic capacitor effectively connecting said one side of said first network through said connection to a point at ground potential thereby tending to change said first network from said condition of balanced to ground potential, and means to neutralize ground admittance to said first network due to the effect of said connection of said first network to said one ground point therethrough, said parasitic capacitor thereby tending to maintain substantially said first network in said condition of balanced to ground potential, comprising a capacitor having one terminal connected to another side of said circuit means and thereby to the opposite side of said first network, and a different terminal connected to a further point at ground potential.

4. In combination in an electrical system, a source of alternating current waves, a pair of output terminals, and circuit means to connect said source to said output terminals, comprising a transformer having a primary winding connected to said source and a secondary winding, an attenuator unbalanced to ground potential to control the amplitudes of said waves, said attenuator having its input applied to said secondary winding and its output applied to said output terminals, shielding means to enclose said attenuator and said secondary winding, an electrical connection extending between said attenuator, said shielding means and one side of said circuit means which side is connected to one of said output terminals, and a parasitic capacitor effectively connecting said connection to a point at ground potential and thereby effectively connecting said one output terminal to said ground point, and means to compensate for the effect of the connection of said one output terminal through said parasitic capacitor to said ground point so that said attenuator is effectively serviceable when a load balanced to ground potential is connected to said output terminals, comprising a further point at ground potential, a further capacitor, and other circuit means to connect said further capacitor between said further ground point and the other of said output terminals, said further capacitor having capacitance equal substantially to the capacitance of said parasitic capacitor.

5. In combination in an electrical circuit, a source of alternating current waves, a pair of output terminals, and circuit means to connect said source to said output terminals, comprising a transformer having a primary winding applied to said source and a secondary winding, an attenuator unbalanced to ground potential to control the amplitudes of said waves, said attenuator having its input applied to said secondary winding and its output applied to said output terminals, shielding means to enclose said secondary winding and said attenuator, an electrical connection extending between said attenuator, said shielding means and one side of said circuit means which side is connected to one of said output terminals, and a parasitic capacitor effectively connecting said connection to a point at ground potential and thereby effectively connecting said one output terminal to said ground point; means to render said attenuator effectively serviceable when said output terminals are applied to either a load unbalanced to ground potential or a load balanced to ground potential, comprising a further point at ground potential, a further capacitor having a first terminal applied to said further point at ground potential, and switching means to connect a second terminal of said further capacitor to the other of said output terminals for a load balanced to ground potential and to disconnect said second terminal of said further capacitor from the other of said output terminals for a load unbalanced to ground potential.

6. In combination in an electrical system, a pair of input terminals for alternating current waves, a pair of conductors balanced to ground potential and having one pair of adjacent terminals applied to said pair of input terminals, amplifying means having its input applied to another pair of adjacent terminals of said balanced conductor pair, a pair of output terminals, a concentric conductor having its outer conductor at ground potential and one pair of adjacent terminals applied to said pair of output terminals, an output transformer having a primary winding applied to the output of said amplifying means and a secondary winding applied to another pair of adjacent terminals of said concentric conductor, shielding means to enclose said output transformer, further shielding means to enclose said output transformer and said first-mentioned shielding means therefor and said amplifying means, an electrical connection extending between said further shielding means, the input of said amplifying means and one conductor of said balanced pair of conductors, a parasitic capacitor for effectively applying said connection to a point at ground potential and thereby effectively connecting said one conductor of said balanced conductor pair to said ground point, a further electrical connection extending between both said shielding means, a further parasitic capacitor for effectively connecting said first-mentioned shielding means to said outer conductor of said concentric conductor, voltage means for energizing said amplifying means, and choke coil means interposed between said voltage means and said amplifying means, a portion of said choke coil means being applied to said further shielding means; means to compensate for the ground admittance effects of said parasitic capacitors and said choke coil means and said ground point to said balanced conductor pair, comprising a variable capacitor applied across said outer conductor of said concentric conductor and the other conductor of said balanced pair of conductors, a further point at ground potential, and an impedance network comprising a further capacitor in parallel with a series inductor and resistor connected between the other conductor of said balanced pair of conductors and said further point at ground potential.

GREGORY N. SLEZSKINSKY.